US012027153B2

(12) United States Patent
Fukuda et al.

(10) Patent No.: US 12,027,153 B2
(45) Date of Patent: Jul. 2, 2024

(54) DATA SORTING FOR GENERATING RNN-T MODELS

(71) Applicant: INTERNATIONAL BUSINESS MACHINES CORPORATION, Armonk, NY (US)

(72) Inventors: Takashi Fukuda, Tokyo (JP); Tohru Nagano, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 17/580,846

(22) Filed: Jan. 21, 2022

(65) Prior Publication Data

US 2023/0237987 A1    Jul. 27, 2023

(51) Int. Cl.
  *G10L 15/02*    (2006.01)
  *G06F 7/24*    (2006.01)
  *G10L 15/06*    (2013.01)

(52) U.S. Cl.
  CPC ............ *G10L 15/02* (2013.01); *G06F 7/24* (2013.01); *G10L 15/063* (2013.01); *G10L 2015/025* (2013.01)

(58) Field of Classification Search
  CPC . G10L 15/02; G10L 15/063; G10L 2015/025; G10L 15/16; G06F 7/24
  See application file for complete search history.

(56) References Cited

U.S. PATENT DOCUMENTS 5,940,794 A  *  8/1999  Abe ................... G10L 15/04
                                                704/E15.005
2019/0392798 A1 * 12/2019 Danjyo ............... G10H 1/366
2021/0183369 A1    7/2021  Yamada et al.

FOREIGN PATENT DOCUMENTS

CN       113223506 A     8/2021

OTHER PUBLICATIONS

Bada et al., "Data Selection in the Framework of Automatic Speech Recognition". ICNLSSP 2017—International conference on natural language, signal and speech processing 2017, Dec. 2017, Casablanca, Morocco. pp. 1-5.
Amodei et al., "Deep Speech 2 : End-to-End Speech Recognition in English and Mandarin", in International conference on machine learning Jun. 11, 2016 (pp. 173-182). PMLR.
Wang et al., "Exploring RNN-Transducer for Chinese Speech Recognition", arXiv:1811.05097v2 [cs.CL] Apr. 23, 2019, pp. 1-5.
Alfiansyah et al., "Partial Greedy Algorithm to Extract a Minimum Phonetically-and-Prosodically Rich Sentence Set", International Journal of Advanced Computer Science and Applications, vol. 9, No. 12, 2018, pp. 1-5.

(Continued)

*Primary Examiner* — Daniel C Washburn
*Assistant Examiner* — Athar N Pasha
(74) *Attorney, Agent, or Firm* — Tutunjian & Bitetto, P.C.; Robert Richard Aragona

(57) ABSTRACT

A computer-implemented method for preparing training data for a speech recognition model is provided including obtaining a plurality of sentences from a corpus, dividing each phoneme in each sentence of the plurality of sentences into three hidden states, calculating, for each sentence of the plurality of sentences, a score based on a variation in duration of the three hidden states of each phoneme in the sentence, and sorting the plurality of sentences by using the calculated scores.

20 Claims, 8 Drawing Sheets

(56) References Cited

OTHER PUBLICATIONS

Mikolov et al., "Strategies for Training Large Scale Neural Network Language Models", In2011 IEEE Workshop on Automatic Speech Recognition & Understanding Dec. 11, 2011 (pp. 196-201). IEEE.

Nagano et al., "Data Augmentation Based on Vowel Stretch for Improving Children's Speech Recognition", In2019 IEEE Automatic Speech Recognition and Understanding Workshop (ASRU) Dec. 14, 2019 (pp. 502-508). IEEE.

Mell et al., "The NIST Definition of Cloud Computing", Recommendations of the National Institute of Standards and Technology, Special Publication 800-145, Sep. 2011, pp. 1-7.

Li, J., Zhao, R., Hu, H., & Gong, Y. (Dec. 14, 2019). Improving RNN transducer modeling for end-to-end speech recognition. In 2019 IEEE Automatic Speech Recognition and Understanding Workshop (ASRU) (pp. 114-121). IEEE.

Qian, Y., & Zhou, Z. (Jan. 5, 2022). Optimizing Data Usage for Low-Resource Speech Recognition. IEEE/ACM Transactions on Audio, Speech, and Language Processing, 30, 394-403.

Dokuz, Y., & Tufekci, Z. (Jan. 1, 2021). Mini-batch sample selection strategies for deep learning based speech recognition. Applied Acoustics, 171, 107573.

International Search Report from PCT/EP2023/050845 dated Mar. 17, 2023. (12 pages).

\* cited by examiner

Case 1: Phoneme-*independent* evenness score when statistics from clean speech are NOT available $$S = \frac{1}{N} \sum_{n=0}^{N} \sum_{x=\{b,m,e\}} (d_{n,x} - \mu_n)^2$$

Case 2: Phoneme-*dependent* evenness score when statistics from clean speech are available $$S = \frac{1}{N} \sum_{n=0}^{N} \sum_{x=\{b,m,e\}} (d_{n,x} - \lambda_{k(n),x})^2$$

FIG. 3

DATA SORTING FOR GENERATING RNN-T MODELS

BACKGROUND

The present invention relates generally to machine learning, and more specifically, to methods and systems for data sorting for generating recurrent neural network transducer (RNN-T) models.

End-to-end models for automatic speech recognition (ASR) have gained popularity in recent years as a way to fold separate components of a conventional ASR system (e.g., acoustic, pronunciation and language models) into a single neural network. Examples of such models include connectionist temporal classification (CTC) based models, recurrent neural network transducer (RNN-T), and attention-based seq2seq models. Among these models, RNN-T is the most suitable streaming end-to-end recognizer, which has shown competitive performance compared to conventional systems.

SUMMARY

In accordance with an embodiment, a computer-implemented method for preparing training data for a speech recognition model is provided. The computer-implemented method includes obtaining a plurality of sentences from a corpus, dividing each phoneme in each sentence of the plurality of sentences into three hidden states, calculating, for each sentence of the plurality of sentences, a score based on a variation in duration of the three hidden states of each phoneme in the sentence, and sorting the plurality of sentences by using the calculated scores.

In accordance with another embodiment, a computer program product for preparing training data for a speech recognition model is provided. The computer program product includes a computer readable storage medium having program instructions embodied therewith, the program instructions executable by a computer to cause the computer to obtain a plurality of sentences from a corpus, divide each phoneme in each sentence of the plurality of sentences into three hidden states, calculate, for each sentence of the plurality of sentences, a score based on a variation in duration of the three hidden states of each phoneme in the sentence, and sort the plurality of sentences by using the calculated scores.

In accordance with yet another embodiment, a system for preparing training data for a speech recognition model is provided. The system includes a memory and one or more processors in communication with the memory configured to obtain a plurality of sentences from a corpus, divide each phoneme in each sentence of the plurality of sentences into three hidden states, calculate, for each sentence of the plurality of sentences, a score based on a variation in duration of the three hidden states of each phoneme in the sentence, and sort the plurality of sentences by using the calculated scores.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein:

FIG. 3 illustrates calculating an evenness score when statistics from clean speech are not available and when statistics from clear speech are available, in accordance with an embodiment of the present invention;

Throughout the drawings, same or similar reference numerals represent the same or similar elements.

DETAILED DESCRIPTION

Figure 1:
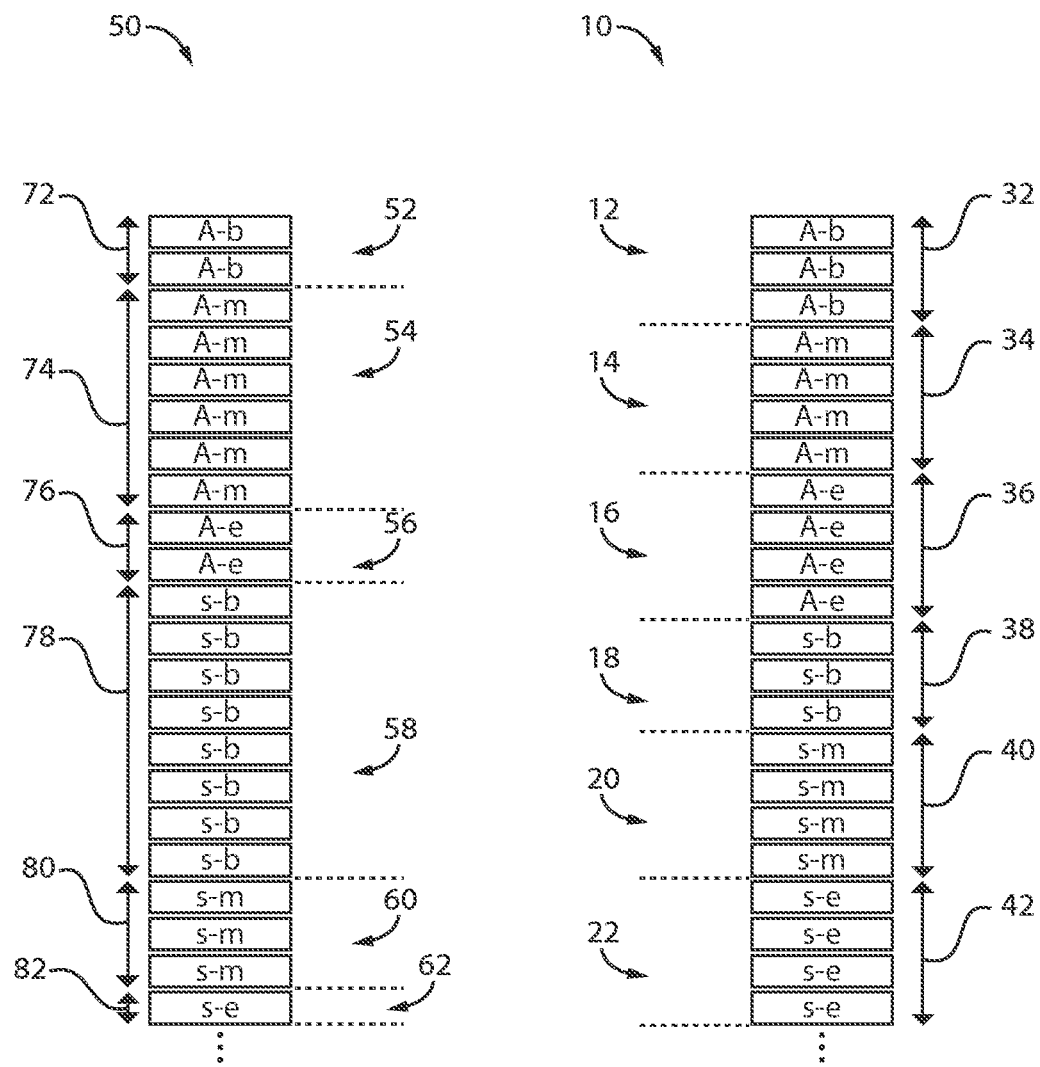
FIG. 1 is a block/flow diagram of an exemplary sequence of phonemes having balanced durations between states and an exemplary sequence of phonemes having imbalanced durations between states, in accordance with an embodiment of the present invention.

Embodiments in accordance with the present invention provide methods and devices for composing an efficient training data sequence for a recurrent neural network transducer (RNN-T) based model. The exemplary embodiments advantageously sort a training dataset by evaluating changes in durations in each phoneme hidden state.

Before delving into RNN-T, speech recognition continues to evolve to meet the untethered and nimble demands of a mobile environment. New speech recognition architectures or improvements to existing architectures continue to be developed that seek to increase the quality of ASR systems. To illustrate, speech recognition initially employed multiple models where each model had a dedicated purpose. For instance, an ASR system included an acoustic model (AM), a pronunciation model (PM), and a language model (LM). The acoustic model mapped segments of audio (e.g., frames of audio) to phonemes. The pronunciation model connected these phonemes together to form words while the language model was used to express the likelihood of given phrases (e.g., the probability of a sequence of words). Yet although these individual models worked together, each model was trained independently and often manually designed on different datasets.

The approach of separate models enabled a speech recognition system to be fairly accurate, especially when the training corpus (e.g., body of training data) for a given model caters to the effectiveness of the model, but needing to independently train separate models introduced its own complexities and led to an architecture with integrated models. These integrated models sought to use a single neural network to directly map an audio waveform (e.g., input sequence) to an output sentence (e.g., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a word piece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive or require real-time voice transcription may pose issues.

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken.

Accordingly, a need exists for more efficient processes for training data sequences using RNN-T. The exemplary embodiments of the present invention introduce a method that improves sorting of training data by analyzing and evaluating changes in durations in each phoneme hidden state.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a block/flow diagram of an exemplary sequence of phonemes having balanced durations between states and an exemplary sequence of phonemes having imbalanced durations between states, in accordance with an embodiment of the present invention.

The exemplary embodiments introduce a method to organize a training data sequence based on an assumption that utterances with balanced phoneme context dependent states are acoustically easy. In other words, if durations of beginning, middle, and ending states for each phoneme are imbalanced, those utterances are regarded as more difficult cases from an acoustical view point. For example, spontaneous speech tends to include imbalanced durations between hidden states, which is more difficult than reading-style speech.

An evenness score based on durations between three hidden states is obtained by a variance of the number of frames in each state to estimate how acoustically difficult the utterance is. It is used as a metric for sorting training samples. The exemplary methods ignore silence-related phonemes (X, VN, NS) when a duration of each hidden state is checked and alignments vary for acoustically difficult utterances.

A sequence of phonemes 10 includes a first phoneme 12 (A-b), a second phoneme 14 (A-m), a third phoneme 16 (A-e), a fourth phoneme 18 (s-b), a fifth phoneme 20 (s-m), and a sixth phoneme 22 (s-e). The first phoneme 12 has a duration 32, the second phoneme 14 has a duration 34, the third phoneme 16 has a duration 36, the fourth phoneme 18 has a duration 38, the fifth phoneme 20 has a duration 40, and the sixth phoneme 22 has a duration 42.

The durations 32, 34, 36, 38, 40, 42 of the phonemes 12, 14, 16, 18, 20, 22 are evenly balanced. Stated differently, each phoneme has a balanced duration between states. In other words, "balanced" refers to a regularity or uniformity or evenness or similarity of each duration. Therefore, the utterances with the balanced phonemes can be referred to as clean speech, that is, speech that is more structured, organized, orderly, precise, logical, and/or measured. Structured speech or clean speech is easier to understand and thus acoustically easy. The frames in each state are more equal or equivalent (less variance between states).

In contrast, a sequence of phonemes 50 includes a first phoneme 72 (A-b), a second phoneme 74 (A-m), a third phoneme 76 (A-e), a fourth phoneme 78 (s-b), a fifth phoneme 80 (s-m), and a sixth phoneme 82 (s-e). The first phoneme 72 has a duration 52, the second phoneme 74 has a duration 54, the third phoneme 76 has a duration 56, the fourth phoneme 78 has a duration 58, the fifth phoneme 80 has a duration 60, and the sixth phoneme 82 has a duration 62.

The durations 72, 74, 76, 78, 80, 82 of the phonemes 52, 54, 56, 58, 60, 62 are not evenly balanced. Stated differently, each phoneme has an imbalanced duration between states. In other words, "imbalanced" refers to an irregularity or non-uniformity or non-evenness or non-similarity of each duration. Therefore, the utterances with the imbalanced phonemes can be referred to as not clean speech, that is, speech that is not structured, organized, orderly, precise, logical, and/or measured. Instead, not clean speech is more chaotic, spontaneous, noisy, disorganized, and disorderly or muddled. Non-structured speech (not clean speech) is harder to understand and thus acoustically difficult. The frames in each state are not as proportionate or comparable or consistent (more variance between states). For example, phoneme 78 has 8 frames, whereas phoneme 82 has 1 frame. As a result, the variance between such frames is high.

Figure 2:
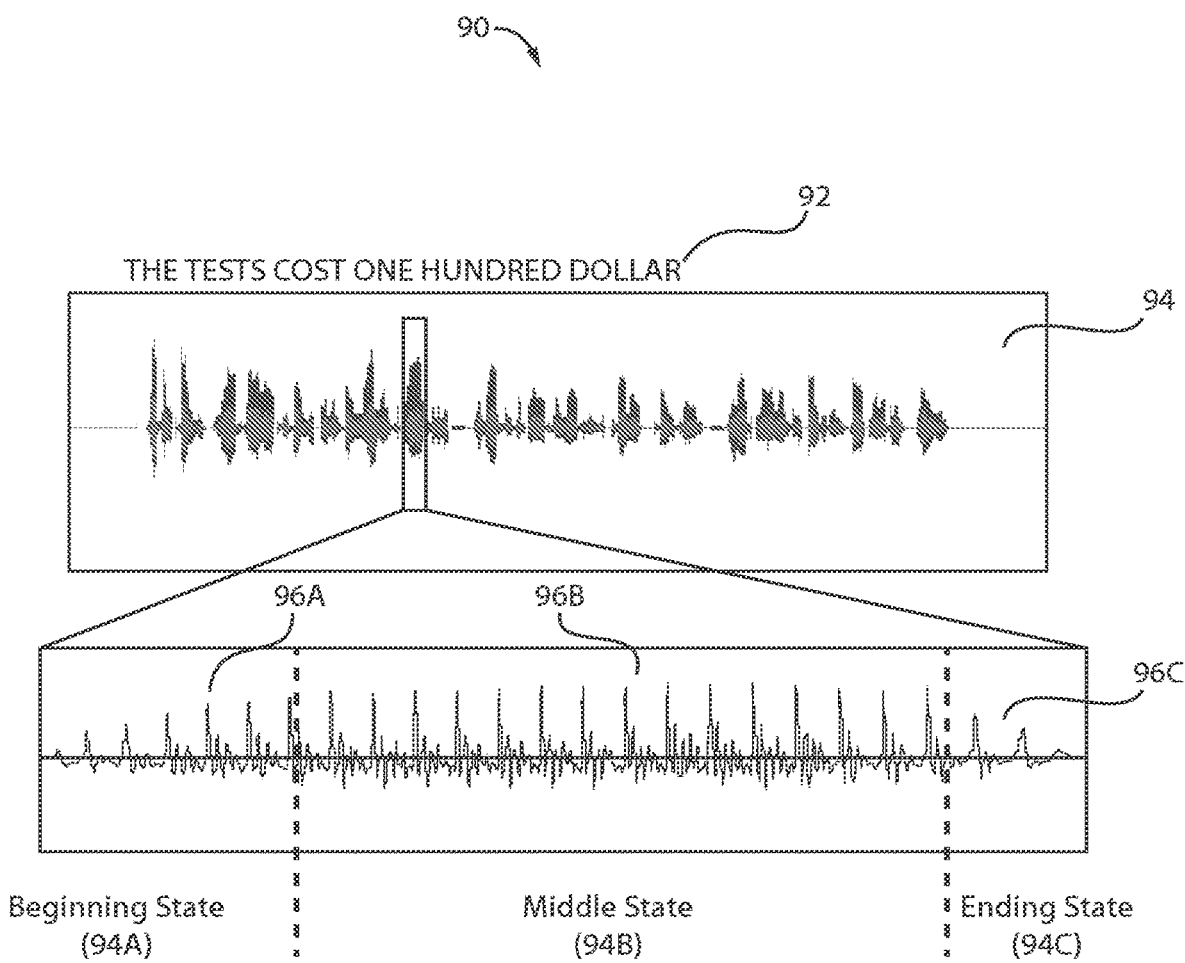
FIG. 2 is a block/flow diagram of an exemplary method for selecting a sentence from a training corpus and dividing a phoneme in the sentence into three hidden states, in accordance with an embodiment of the present invention.

The evenness score described below with reference to FIGS. 2 and 3 is based on the durations between the states and is obtained by the variances of the number of frames in each state.

FIG. 2 is a block/flow diagram 90 of an exemplary method for selecting a sentence from a training corpus and dividing a phoneme in the sentence into three hidden states, in accordance with an embodiment of the present invention.

For the score calculation, a sentence 92 is selected from a training corpus and each phoneme in the sentence is divided or separated into three hidden states. For example, a phoneme 94 is selected from the acoustic representation 93 of the sentence 92. The phoneme 94 is divided into three hidden states, that is, hidden state 1 (94A), hidden state 2 (94B), and hidden state 3 (94C). Hidden state 1 can be referred to as a beginning state, hidden state 2 can be referred to as a middle state, and hidden state 3 can be referred to as an ending state. Hidden state 1 is presented as acoustic representation 96A, hidden state 2 is presented as acoustic representation 96B, and hidden state 2 is presented as acoustic representation 96C.

Then, an evenness score is calculated for each sentence as described below with reference to FIG. 3, where the training samples are sorted in an ascending order based on the calculated evenness score.

FIG. 3 illustrates calculating an evenness score when statistics from clean speech are not available and when statistics from clear speech are available, in accordance with an embodiment of the present invention.

In a first scenario 100, a phoneme-independent evenness score when statistics from clean speech are not available is given as:

$$S = \frac{1}{N}\sum_{n=0}^{N}\sum_{x=\{b,m,e\}}(d_{n,x} - \mu_n)^2$$

Where $d_{n,x}$ is a duration of an x-th state in an n-th phoneme (x takes either b: beginning or m: middle or e: ending), $\mu_n$ is an average duration of the three hidden states in the n-th phoneme obtained by $d_{n,x}$, and N is a total number of phonemes in the sentence.

In a second scenario 102, a phoneme-dependent evenness score when statistics from clean speech are available is given as:

$$S = \frac{1}{N}\sum_{n=0}^{N}\sum_{x=\{b,m,e\}}(d_{n,x} - \lambda_{k(n),x})^2$$

Where $\lambda_{k(n),x}$ is an ideal duration for an x-th state of the phoneme k(n) to which the n-th phoneme should be referred, estimated from clean speech in advance and k(n) is a function to map the n-th phoneme to the corresponding phoneme.

Figure 4:
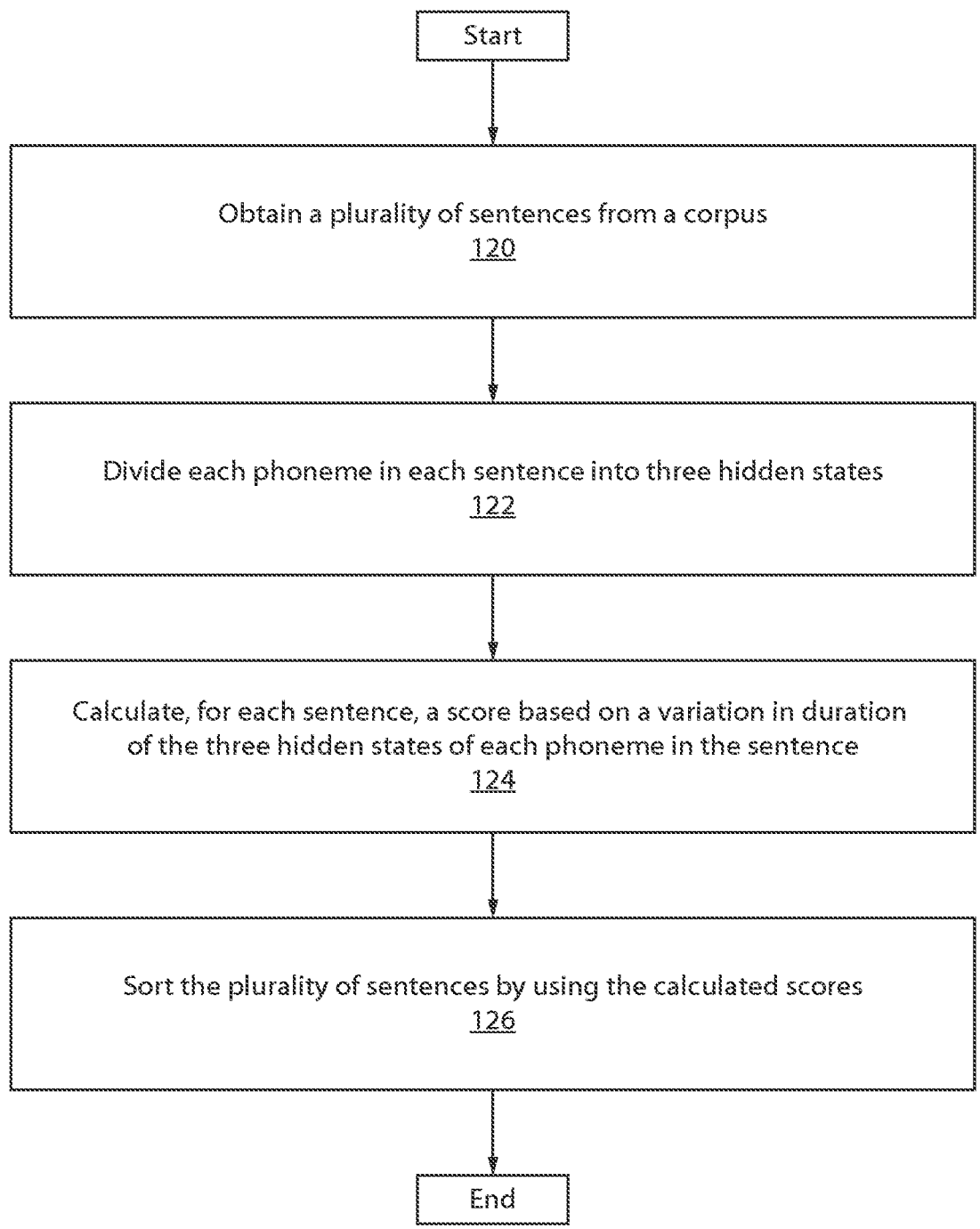
FIG. 4 is a block/flow diagram of an exemplary method for preparing training data for a speech recognition model, in accordance with an embodiment of the present invention.

FIG. 4 is a block/flow diagram of an exemplary method for preparing training data for a speech recognition model, in accordance with an embodiment of the present invention.

At block 120, a plurality of sentences are obtained from a corpus.

At block 122, each phoneme in each sentence is divided into three hidden states.

At block 124, for each sentence, a score is calculated based on a variation in duration of the three hidden states of each phoneme in the sentence.

At block 126, the plurality of sentences are sorted (in, e.g., ascending order) by using the calculated scores.

Figure 5:
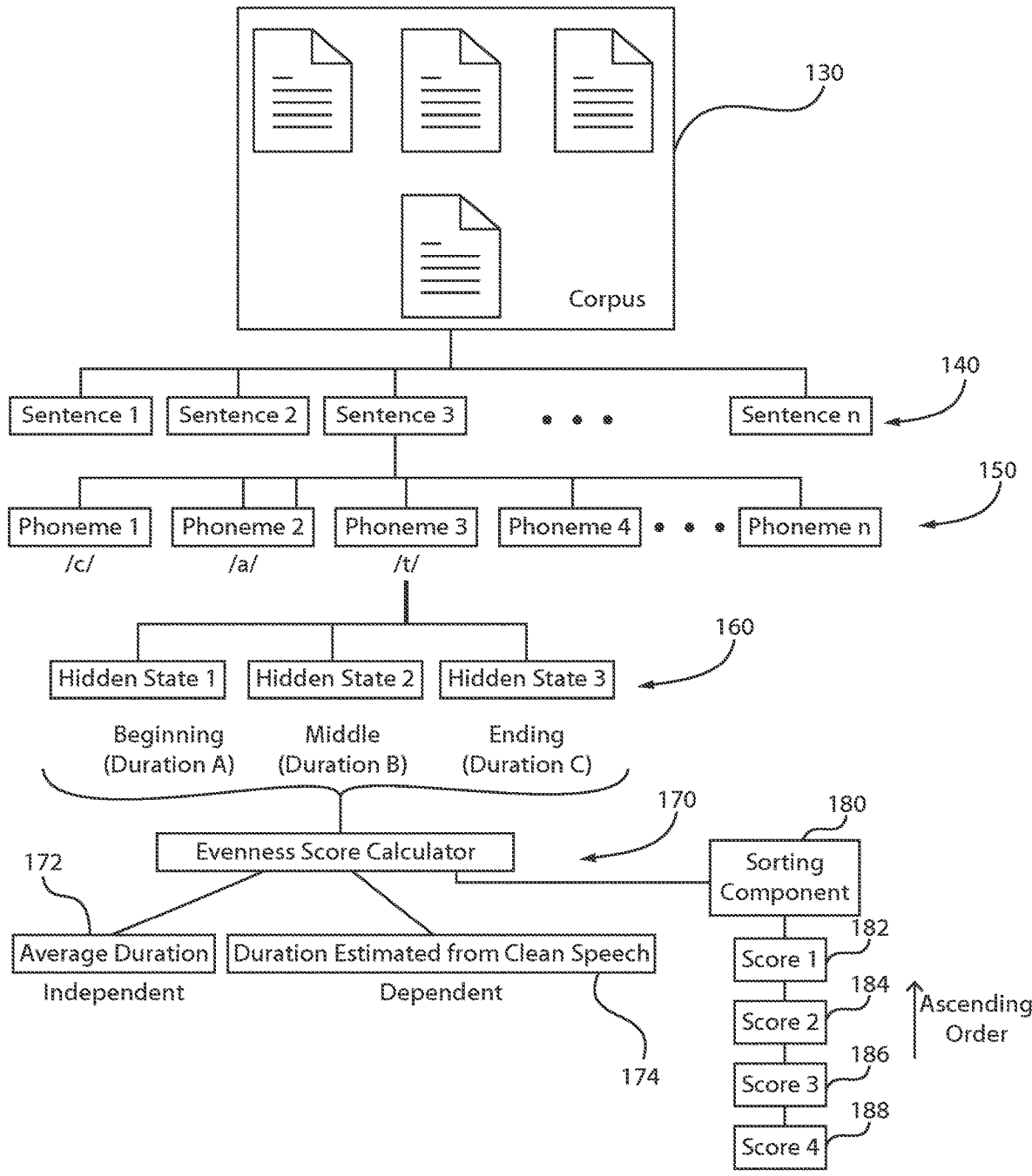
FIG. 5 illustrates a system for preparing training data for a speech recognition model, in accordance with an embodiment of the present invention.

FIG. 5 illustrates a system for preparing training data for a speech recognition model, in accordance with an embodiment of the present invention.

A corpus 130 is presented including a collection of a plurality of written texts from a plurality of different sources. Sentences 140 can be extracted from the corpus 130. In one example, sentence 3 from the sentences 140 can be selected. Phonemes 150 are derived from Sentence 3.

A phoneme can be defined as the smallest class of sounds that leads, in a specific language, to differences in meaning. For example, in English, /l/and /r/ are two phonemes because replacing one with the other produces words with different meanings, as is apparent with 'royal' and 'loyal.' It is noted that phonemes are usually indicated by two slashes.

Phonemes vary considerably in the way they are pronounced (the variations are called 'phones'), that is, people speak with different accents, different speeds, and different pitches of voice (e.g., male vs female voices). In fact, it has been found that even a word as short and common as 'the' can be pronounced in many distinct ways.

Each of the phonemes 150 is divided into three hidden states. For example, phoneme 1 can be /c/, phoneme 2 can be /a/, and phoneme 3 can be /t/. Phoneme 1 is divided into three hidden states, phoneme 2 is divided into three hidden states, phoneme 3 is divided into three hidden states, etc. For simplicity, phoneme 3 is shown being divided into three hidden states 160. Hidden state 1 is the beginning state, hidden state 2 is the middle state, and hidden state 3 is the ending state. Hidden state 1 has a duration A, hidden state 2 has a duration B, and hidden state 3 has a duration C. The beginning state represents a first acoustic wave, the middle state represents a second acoustic wave, and the ending state represents a third acoustic wave, each of the acoustic waves potentially having different frequencies.

An evenness score calculator 170 is employed to calculate an evenness score based on when statistics from the clean speech are available or not. Statistics can refer to various data or information or samples of data related to a number of variables or parameters.

In one instance, the evenness score is calculated from an average duration 172 of the three states of a phoneme. In another instance, the evenness score is calculated from an ideal duration 174 estimated from clean speech in advance.

The training samples can be sorted by a sorting component 180. The training samples can be sorted in, e.g., an ascending order of the proposed evenness scores 182, 184, 186, 188.

Figure 6:
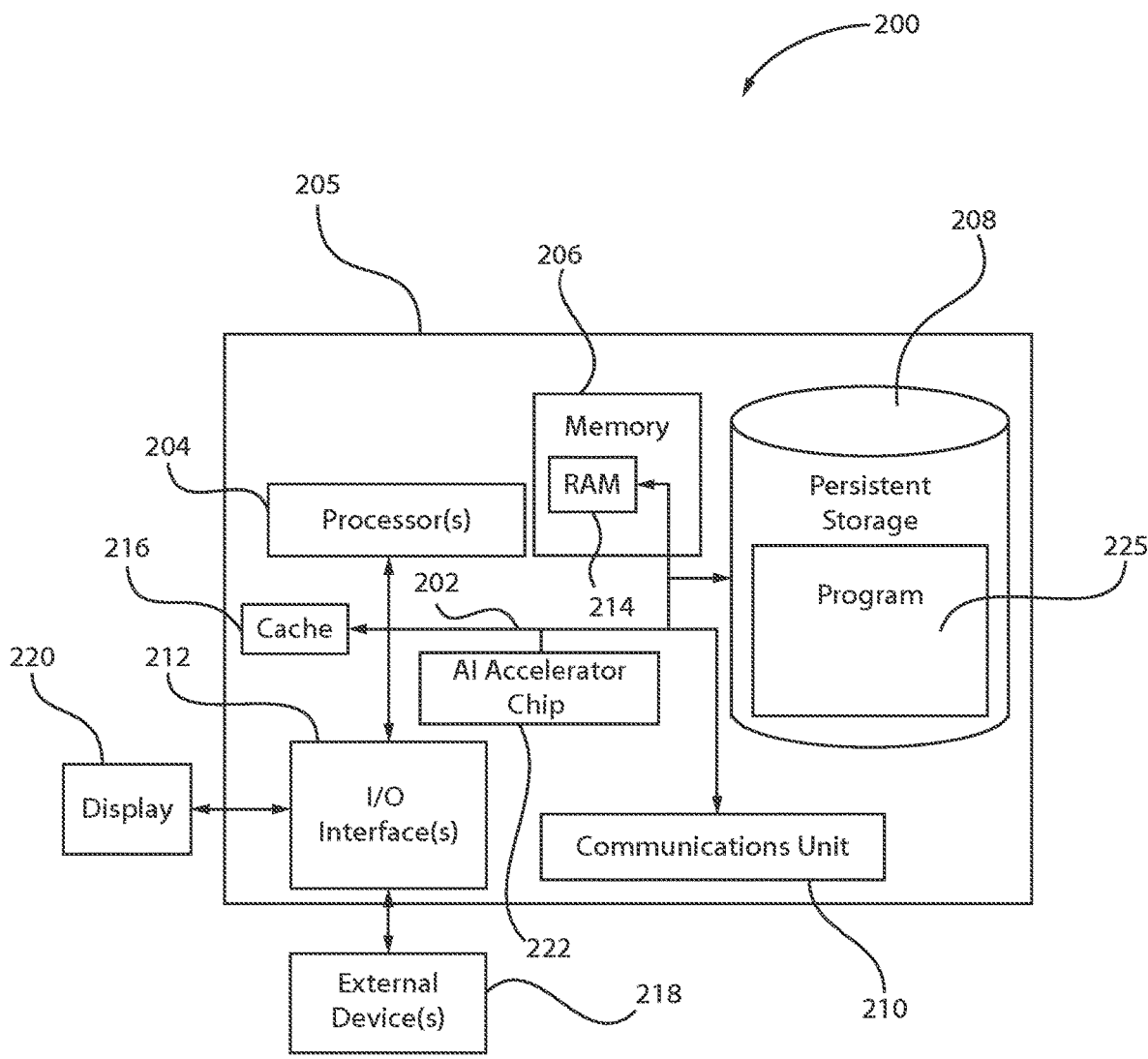
FIG. 6 is a block/flow diagram of an exemplary processing system for preparing training data for a speech recognition model, in accordance with an embodiment of the present invention.

FIG. 6 is a block/flow diagram of an exemplary processing system for preparing training data for a speech recognition model, in accordance with an embodiment of the present invention.

FIG. 6 depicts a block diagram of components of system 200, which includes computing device 205. It should be appreciated that FIG. 6 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement a training data sequence for RNN-T including data sorting techniques described herein) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 7:
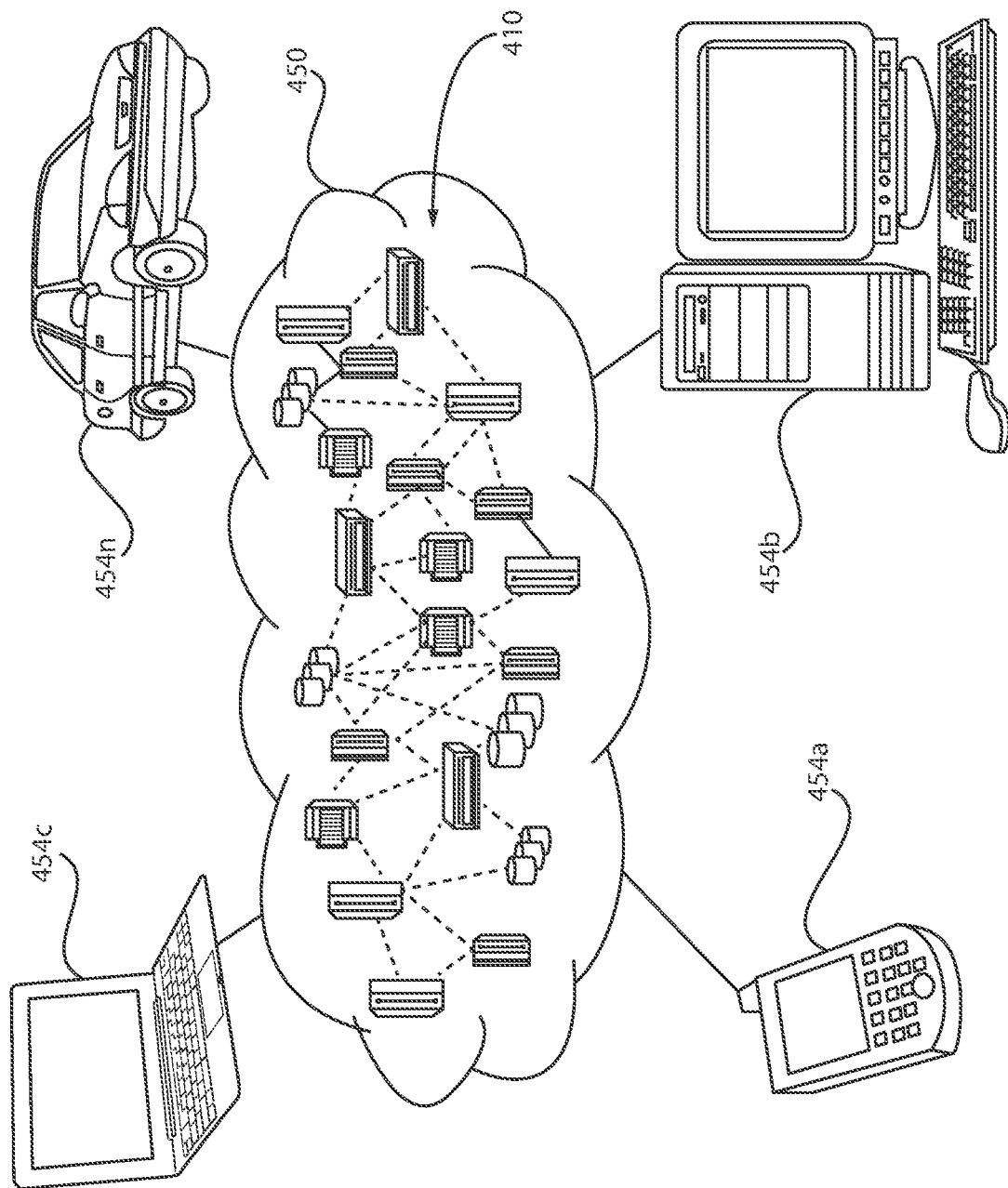
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 7 are intended to be illustrative only and that computing nodes 410 and cloud computing environment 450 can communicate with any type of computerized device over any type of network and/or network addressable connection (e.g., using a web browser).

Figure 8:
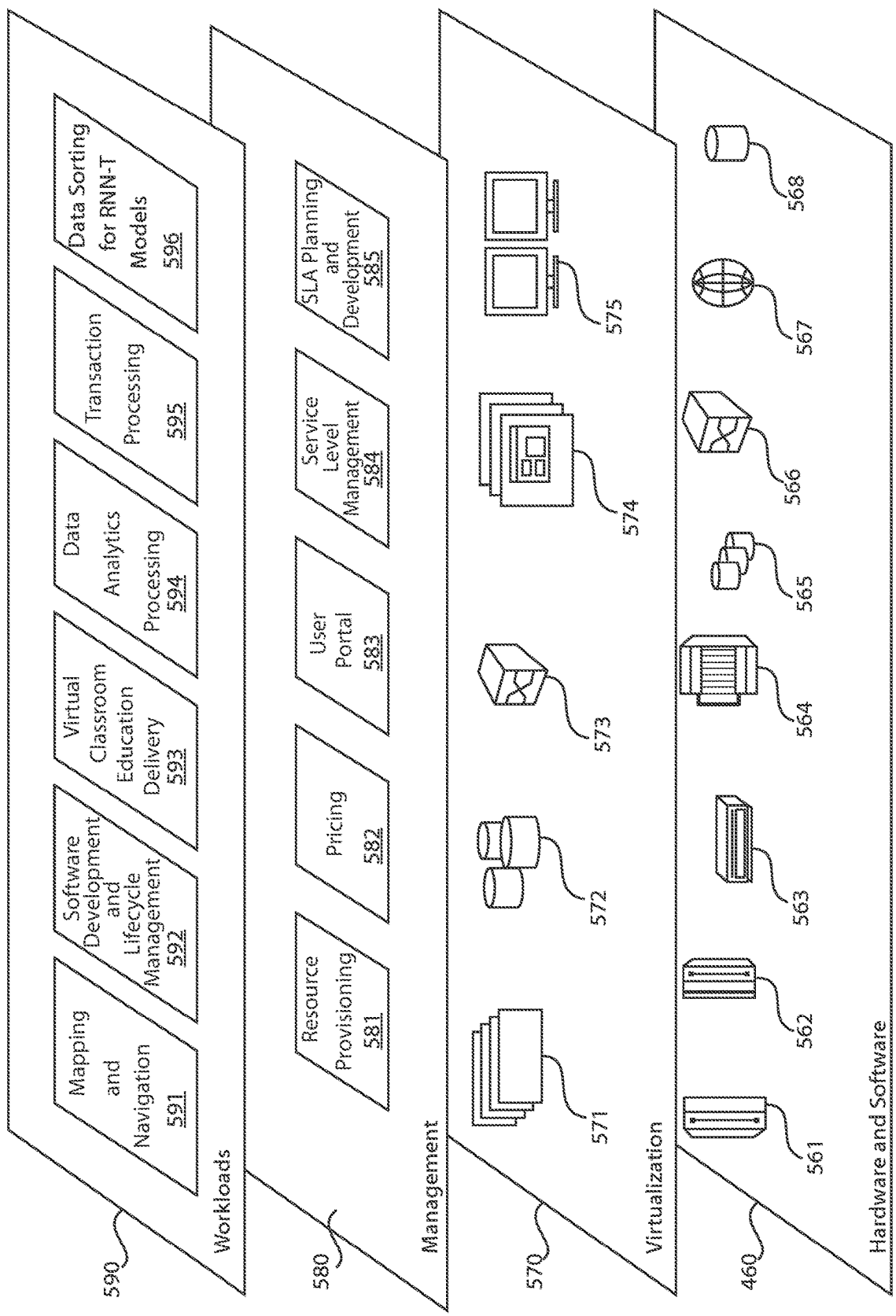
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and data sorting for RNN-T models 596.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of methods and systems for data sorting for generating recurrent neural network transducer (RNN-T) models (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for preparing training data for a speech recognition model, the method comprising:
obtaining a plurality of sentences from a corpus;
dividing each phoneme in each sentence of the plurality of sentences into three hidden states;
calculating, for each sentence of the plurality of sentences, a score based on a variation in duration of the three hidden states of each phoneme in the sentence; and
sorting the plurality of sentences by using the calculated scores.

2. The computer-implemented method of claim 1, wherein each score is calculated by using an average duration of the three hidden states in each phoneme in the sentence.

3. The computer-implemented method of claim 1, wherein each score is calculated by using a duration for each of the three hidden states in each phoneme in the sentence previously estimated from clean speech.

4. The computer-implemented method of claim 1, wherein the score is a phoneme-independent evenness score when statistics from clean speech are not available.

5. The computer-implemented method of claim 4, wherein the phoneme-independent evenness score is given as:

$$S = \frac{1}{N}\sum_{n=0}^{N}\sum_{x=\{b,m,e\}} (d_{n,x} - \mu_n)^2$$

where $d_{n,x}$ is a duration of an x-th state in an n-th phoneme such that x takes either beginning (b) or middle (m) or ending (e), $\mu_n$ is an average duration of the three hidden states in the n-th phoneme obtained by $d_{n,x}$, and N is a total number of phonemes in the sentence.

6. The computer-implemented method of claim 1, wherein the score is a phoneme-dependent evenness score when statistics from clean speech are available.

7. The computer-implemented method of claim 6, wherein the phoneme-dependent evenness score is given as:

$$S = \frac{1}{N}\sum_{n=0}^{N}\sum_{x=\{b,m,e\}} (d_{n,x} - \lambda_{k(n),x})^2$$

where $\lambda_{k(n),x}$ is an ideal duration for an x-th state of phoneme k(n) to which an n-th phoneme should be referred, estimated from the clean speech in advance and k(n) is a function to map the n-th phoneme to a corresponding phoneme.

8. A computer program product for preparing training data for a speech recognition model including a computer readable storage medium having program instructions embodied therewith, the program instructions executable by a computer to cause the computer to: obtain a plurality of sentences from a corpus; divide each phoneme in each sentence of the plurality of sentences into three hidden states; calculate, for each sentence of the plurality of sentences, a score based on a variation in duration of the three hidden states of each phoneme in the sentence; and sort the plurality of sentences by using the calculated scores.

9. The computer program product of claim 8, wherein each score is calculated by using an average duration of the three hidden states in each phoneme in the sentence.

10. The computer program product of claim 8, wherein each score is calculated by using a duration for each of the three hidden states in each phoneme in the sentence previously estimated from clean speech.

11. The computer program product of claim 8, wherein the score is a phoneme-independent evenness score when statistics from clean speech are not available.

12. The computer program product of claim 11, wherein the phoneme-independent evenness score is given as:

$$S = \frac{1}{N}\sum_{n=0}^{N}\sum_{x=\{b,m,e\}} (d_{n,x} - \mu_n)^2$$

where $d_{n,x}$ is a duration of an x-th state in an n-th phoneme such that x takes either beginning (b) or middle (m) or ending (e), $\mu_n$ is an average duration of the three hidden states in the n-th phoneme obtained by $d_{n,x}$, and N is a total number of phonemes in the sentence.

13. The computer program product of claim 8, wherein the score is a phoneme-dependent evenness score when statistics from clean speech are available.

14. The computer program product of claim 13, wherein the phoneme-dependent evenness score is given as:

$$S = \frac{1}{N}\sum_{n=0}^{N}\sum_{x=\{b,m,e\}} (d_{n,x} - \lambda_{k(n),x})^2$$

where $\lambda_{k(n),x}$ is an ideal duration for an x-th state of phoneme k(n) to which an n-th phoneme should be referred, estimated from the clean speech in advance and k(n) is a function to map the n-th phoneme to a corresponding phoneme.

15. A system for preparing training data for a speech recognition model, the system comprising:
a memory; and
one or more processors in communication with the memory configured to:
obtain a plurality of sentences from a corpus;
divide each phoneme in each sentence of the plurality of sentences into three hidden states;
calculate, for each sentence of the plurality of sentences, a score based on a variation in duration of the three hidden states of each phoneme in the sentence; and
sort the plurality of sentences by using the calculated scores.

16. The system of claim 15, wherein each score is calculated by using an average duration of the three hidden states in each phoneme in the sentence.

17. The system of claim 15, wherein each score is calculated by using a duration for each of the three hidden states in each phoneme in the sentence previously estimated from clean speech.

18. The system of claim 15, wherein the score is a phoneme-independent evenness score when statistics from clean speech are not available.

19. The system of claim 18, wherein the phoneme-independent evenness score is given as:

$$S = \frac{1}{N}\sum_{n=0}^{N}\sum_{x=\{b,m,e\}}(d_{n,x} - \mu_n)^2$$

where $d_{n,x}$ is a duration of an x-th state in an n-th phoneme such that x takes either beginning (b) or middle (m) or ending (e), $\mu_n$ is an average duration of the three hidden states in the n-th phoneme obtained by $d_{n,x}$, and N is a total number of phonemes in the sentence.

20. The system of claim 15, wherein the score is a phoneme-dependent evenness score when statistics from clean speech are available, the phoneme-dependent evenness score given as:

$$S = \frac{1}{N}\sum_{n=0}^{N}\sum_{x=\{b,m,e\}}(d_{n,x} - \lambda_{k(n),x})^2$$

where $\lambda_{k(n),x}$ is an ideal duration for an x-th state of phoneme k(n) to which an n-th phoneme should be referred, estimated from the clean speech in advance and k(n) is a function to map the n-th phoneme to a corresponding phoneme.

* * * * *